United States Patent
Roberts et al.

(10) Patent No.: US 11,391,155 B2
(45) Date of Patent: *Jul. 19, 2022

(54) SYSTEM AND METHOD FOR PERFORMING AN IN SITU REPAIR OF AN INTERNAL COMPONENT OF A GAS TURBINE ENGINE

(71) Applicant: General Electric Company, Schenectady, NY (US)

(72) Inventors: Herbert Chidsey Roberts, Middletown, OH (US); Nicholas Edward Antolino, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/072,265

(22) Filed: Oct. 16, 2020

(65) Prior Publication Data
US 2021/0222556 A1     Jul. 22, 2021

Related U.S. Application Data

(62) Division of application No. 15/185,194, filed on Jun. 17, 2016, now Pat. No. 10,822,950.

(51) Int. Cl.
*F16B 5/01* (2006.01)
*F01D 5/00* (2006.01)
(Continued)

(52) U.S. Cl.
CPC .............. *F01D 5/005* (2013.01); *B29C 73/02* (2013.01); *F01D 5/12* (2013.01); *F01D 25/24* (2013.01);
(Continued)

(58) Field of Classification Search
CPC . F01D 5/005; F01D 5/12; F01D 25/24; B29C 73/02
See application file for complete search history.

(56) References Cited

U.S. PATENT DOCUMENTS 3,318,580 A * 5/1967 Simonetti ........... B01F 7/00775
366/172.2
3,684,250 A * 8/1972 Roeser .................... B29B 7/404
366/160.4
(Continued)

FOREIGN PATENT DOCUMENTS

EP           0669193 B1     5/1999
JP       2008/049598 A     3/2008
(Continued)

OTHER PUBLICATIONS

Chinese Office Action Corresponding to CN201780037645 dated Apr. 10, 2020.
(Continued)

*Primary Examiner* — Jeffry H Aftergut
*Assistant Examiner* — Jaeyun Lee
(74) *Attorney, Agent, or Firm* — Fitch, Even, Tabin & Flannery LLP (57) ABSTRACT

In one aspect, a method for performing in situ repairs of internal components of a gas turbine engine may generally include inserting a repair tool within an interior of the gas turbine engine such that a tip end of the repair tool is positioned within the gas turbine engine and an exterior end is positioned outside the gas turbine engine. The method may also include positioning the tip end of the repair tool adjacent to a defect of an internal component, wherein the defect defines a fillable volume along a portion of the internal component. In addition, the method may include intermixing two or more constituents of a repair agent within the repair tool at a mixing location defined within the gas turbine engine, and expelling the repair agent from the tip end such that the fillable volume is at least partially filled with the repair agent.

13 Claims, 9 Drawing Sheets

(51) Int. Cl.
*B29C 73/02* (2006.01)
*F01D 5/12* (2006.01)
*F01D 25/24* (2006.01)
*B29L 31/30* (2006.01)

(52) U.S. Cl.
CPC .............. *B29L 2031/3076* (2013.01); *F23R 2900/00019* (2013.01)

(56) References Cited

U.S. PATENT DOCUMENTS

| | | |
|---|---|---|
| 4,415,275 A | 11/1983 | Dietrich |
| 4,538,920 A | 9/1985 | Drake |
| 4,809,539 A | 3/1989 | Goodman |
| 5,188,455 A | 2/1993 | Hammerstedt |
| 5,716,130 A * | 2/1998 | Wood .................. B01F 13/06 366/139 |
| 6,196,744 B1 | 3/2001 | Landry et al. |
| 8,205,862 B2 | 6/2012 | Goltenboth et al. |
| 2004/0267193 A1 | 12/2004 | Bagaoisan et al. |
| 2005/0103068 A1 | 5/2005 | Kwon |
| 2008/0057195 A1 | 3/2008 | Schlichting |
| 2009/0026637 A1 | 1/2009 | Goltenboth et al. |
| 2013/0025699 A1 | 1/2013 | Bourbeau |
| 2014/0044939 A1 | 2/2014 | Hunt et al. |
| 2015/0174838 A1 | 6/2015 | Kittleson et al. |
| 2015/0209915 A1 | 7/2015 | Rautenberg et al. |

FOREIGN PATENT DOCUMENTS

| | | |
|---|---|---|
| WO | WO93/05334 A1 | 3/1993 |
| WO | WO94/04605 A1 | 3/1994 |

OTHER PUBLICATIONS

Chinese Search Report Corresponding to CN1780037645 dated Apr. 6, 2020.
PCT International Search Report Corresponding to PCT/US2017/036966 dated Sep. 8, 2017.

* cited by examiner

SYSTEM AND METHOD FOR PERFORMING AN IN SITU REPAIR OF AN INTERNAL COMPONENT OF A GAS TURBINE ENGINE

CROSS-REFERENCE TO RELATED APPLICATION

The present application claims priority to U.S. application Ser. No. 15/185,194 entitled "System and Method for Performing an In Situ Repair of an Internal Component of a Gas Turbine Engine", filed Jun. 17, 2016, the entire disclosure of which is hereby expressly incorporated by reference herein.

FIELD OF THE INVENTION

The present subject matter relates generally to gas turbine engines and, more particularly, to a system and method for performing an in situ repair of an internal component of a gas turbine engine.

BACKGROUND OF THE INVENTION

A gas turbine engine typically includes a turbomachinery core having a high pressure compressor, combustor, and high pressure turbine in serial flow relationship. The core is operable in a known manner to generate a primary gas flow. The high pressure compressor includes annular arrays ("rows") of stationary vanes that direct air entering the engine into downstream, rotating blades of the compressor. Collectively one row of compressor vanes and one row of compressor blades make up a "stage" of the compressor. Similarly, the high pressure turbine includes annular rows of stationary nozzle vanes that direct the gases exiting the combustor into downstream, rotating blades of the turbine. Collectively, one row of nozzle vanes and one row of turbine blades make up a "stage" of the turbine. Typically, both the compressor and turbine include a plurality of successive stages.

Gas turbine engines, particularly aircraft engines, require a high degree of periodic maintenance. For example, periodic maintenance is often scheduled to allow internal components of the engine to be inspected for defects and subsequently repaired. Unfortunately, many conventional repair methods used for aircraft engines require that the engine be removed from the body of the aircraft and subsequently partially or fully disassembled. As such, these repair methods result in a significant increase in both the time and the costs associated with repairing internal engine components.

Accordingly, a system and method for performing an in situ repair of an internal component of a gas turbine engine would be welcomed within the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for performing in situ repairs of internal components of a gas turbine engine. The method may include inserting a repair tool within an interior of the gas turbine engine such that a tip end of the repair tool is positioned within the interior of the gas turbine engine and at least one exterior end is positioned outside the gas turbine engine. The method may also include positioning the tip end of the repair tool adjacent to a defect of an internal component of the gas turbine engine, wherein the defect defines a fillable volume along a portion of the internal component. In addition, the method may include intermixing two or more constituents of a repair agent within the repair tool at a mixing location positioned within the interior of the gas turbine engine. The method may also include expelling the repair agent from the tip end such that the fillable volume is at least partially filled with the repair agent.

In another aspect, the present subject matter is directed to a system for performing in situ repairs of internal components of the gas turbine engine. The system may generally include an internal component installed within the gas turbine engine, wherein the internal component includes a defect defining an internal volume. The system may also include a repair tool extending lengthwise between a tip end and an exterior end, wherein the tip end is configured to be positioned within the gas turbine engine adjacent to the defect and the exterior end is positioned outside the gas turbine engine. The repair tool may also include a mixing chamber that defines a mixing location within the gas turbine engine, wherein the mixing chamber includes two or more constituents of a repair agent contained therein. In addition, the repair tool may also include an agitator positioned within the chamber, wherein the agitator is configured to intermix the two or more constituents of the repair agent within the mixing chamber. Further, the repair tool may be configured to expel the repair agent from the tip end of the repair tool such that the fillable volume is at least partially filled with the repair agent.

In a further aspect, the present subject matter is directed to a system for performing in situ repairs of internal components of a gas turbine engine. The system may generally include an internal component installed within the gas turbine engine, wherein the internal component includes a defect defining a fillable volume. The system may also include a repair tool configured to receive a first constituent material and a second constituent material, wherein the repair tool extends between a tip end and first and second supply ends. The tip end of the repair tool may be configured to be positioned within the gas turbine engine adjacent to the defect of the internal component, and the first and second supply ends may be configured to be positioned outside the gas turbine engine. In addition, the repair tool may include a first conduit that extends between the first supply end and the tip end, and may further include a second conduit that extends between the second supply end and the tip end. The first conduit may receive the first constituent material, and the second conduit may receive the second constituent material. Further, the first and second conduits may merge at or adjacent to a mixing location of the repair tool positioned within the gas turbine engine such that the first and second constituent materials are intermixed at the mixing location to form a repair agent. Still further, the repair tool may be configured to be expel the repair agent from the tip end of the repair tool such that the fillable volume is at least partially filled with the repair agent.

These and other features, aspects and advantages of the present invention will be better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for performing an in situ repair of an internal component of a gas turbine engine. Specifically, in several embodiments, the system may include a repair tool configured to be inserted through an access port of the gas turbine engine to allow a repair tip or tip end of the tool to be positioned adjacent to a defect of an internal component of the engine, such as a crack, void, distressed area or any other defect defining a fillable volume. As will be described below, the repair tool may be configured to intermix two or more constituents of a repair agent at a mixing location within the gas turbine engine. For example, in one embodiment, a first conduit of the repair tool and a second conduit of the repair tool may merge at the mixing location so that a first constituent material flowing through the first conduit and a second constituent material flowing through the second conduit intermix at the mixing location to form the repair agent. In another embodiment, the repair tool may be configured to intermix two or more constituents of the repair agent at the mixing location by agitating the constituent materials within a mixing chamber of the repair tool after the tool has been inserted through the access port of the engine.

It should be appreciated that the disclosed system and method may generally be used to perform in situ repairs of internal components located within any suitable type of gas turbine engine, including aircraft-based turbine engines and land-based turbine engines, regardless of the engine's current assembly state (e.g., fully or partially assembled). Additionally, with reference to aircraft engines, it should be appreciated that the present subject matter may be implemented on wing or off wing.

Figure 1:
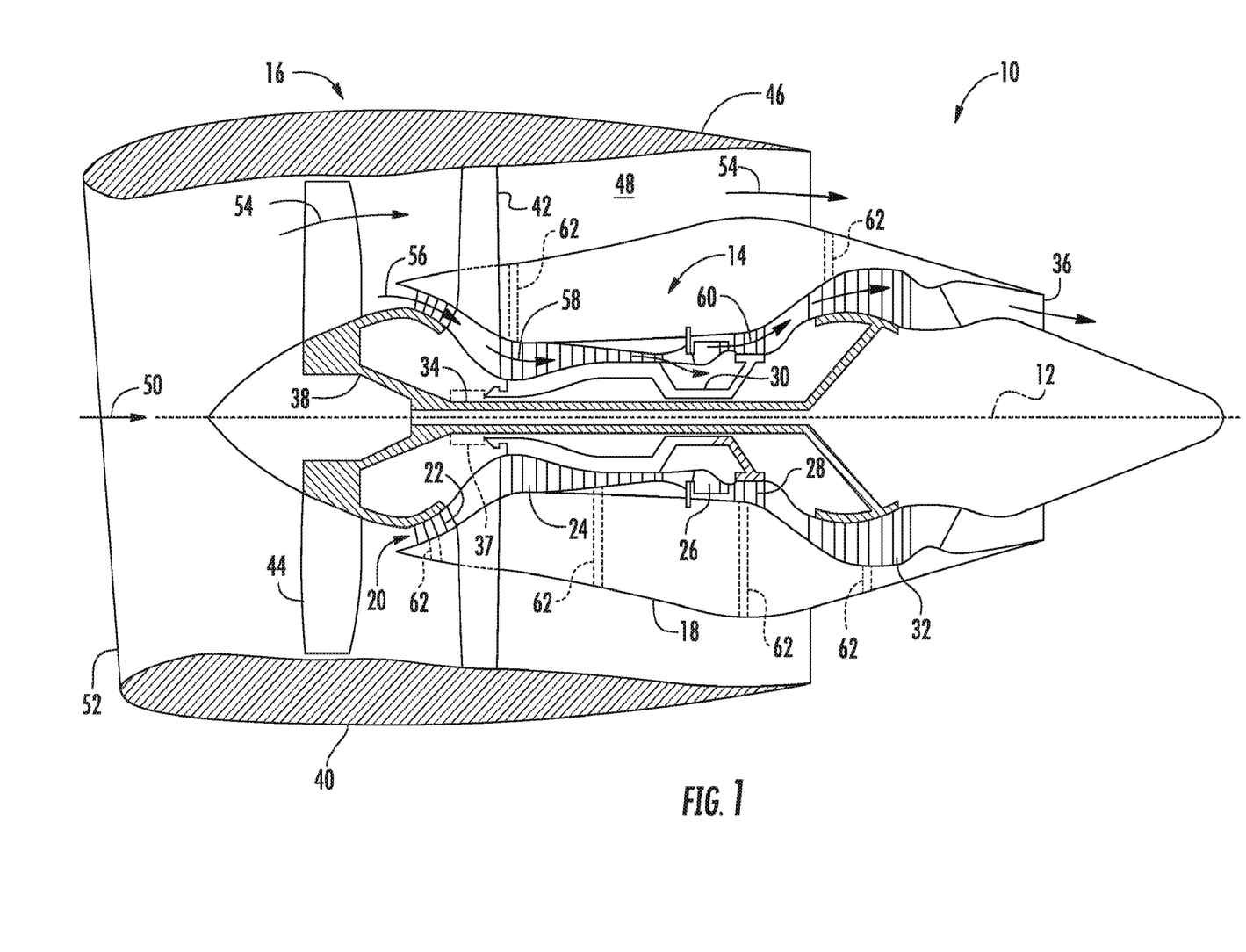
FIG. 1 illustrates a cross-sectional view of one embodiment of a gas turbine engine that may be utilized within an aircraft in accordance with aspects of the present subject matter.

Referring now to the drawings, FIG. 1 illustrates a cross-sectional view of one embodiment of a gas turbine engine 10 that may be utilized within an aircraft in accordance with aspects of the present subject matter, with the engine 10 being shown having a longitudinal or axial centerline axis 12 extending therethrough for reference purposes. In general, the engine 10 may include a core gas turbine engine (indicated generally by reference character 14) and a fan section 16 positioned upstream thereof. The core engine 14 may generally include a substantially tubular outer casing 18 that defines an annular inlet 20. In addition, the outer casing 18 may further enclose and support a booster compressor 22 for increasing the pressure of the air that enters the core engine 14 to a first pressure level. A high pressure, multi-stage, axial-flow compressor 24 may then receive the pressurized air from the booster compressor 22 and further increase the pressure of such air. The pressurized air exiting the high-pressure compressor 24 may then flow to a combustor 26 within which fuel is injected into the flow of pressurized air, with the resulting mixture being combusted within the combustor 26. The high energy combustion products are directed from the combustor 26 along the hot gas path of the engine 10 to a first (high pressure) turbine 28 for driving the high pressure compressor 24 via a first (high pressure) drive shaft 30, and then to a second (low pressure) turbine 32 for driving the booster compressor 22 and fan section 16 via a second (low pressure) drive shaft 34 that is generally coaxial with first drive shaft 30. After driving each of turbines 28 and 32, the combustion products may be expelled from the core engine 14 via an exhaust nozzle 36 to provide propulsive jet thrust.

Additionally, as shown in FIG. 1, the fan section 16 of the engine 10 may generally include a rotatable, axial-flow fan rotor assembly 38 that is configured to be surrounded by an annular fan casing 40. It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor assembly 38 and its corresponding fan rotor blades 44. Moreover, a downstream section 46 of the fan casing 40 may extend over an outer portion of the core engine 14 so as to define a secondary, or by-pass, airflow conduit 48 that provides additional propulsive jet thrust.

It should be appreciated that, in several embodiments, the second (low pressure) drive shaft 34 may be directly coupled to the fan rotor assembly 38 to provide a direct-drive configuration. Alternatively, the second drive shaft 34 may be coupled to the fan rotor assembly 38 via a speed reduction device 37 (e.g., a reduction gear or gearbox) to provide an indirect-drive or geared drive configuration. Such a speed reduction device(s) may also be provided between any other suitable shafts and/or spools within the engine 10 as desired or required.

During operation of the engine 10, it should be appreciated that an initial air flow (indicated by arrow 50) may enter the engine 10 through an associated inlet 52 of the fan casing 40. The air flow 50 then passes through the fan blades 44 and splits into a first compressed air flow (indicated by arrow 54) that moves through conduit 48 and a second compressed air flow (indicated by arrow 56) which enters the booster compressor 22. The pressure of the second compressed air flow 56 is then increased and enters the high pressure compressor 24 (as indicated by arrow 58). After mixing with fuel and being combusted within the combustor 26, the combustion products 60 exit the combustor 26 and flow through the first turbine 28. Thereafter, the combustion products 60 flow through the second turbine 32 and exit the exhaust nozzle 36 to provide thrust for the engine 10.

The gas turbine engine 10 may also include a plurality of access ports defined through its casings and/or frames for providing access to the interior of the core engine 14. For instance, as shown in FIG. 1, the engine 10 may include a plurality of access ports 62 (only six of which are shown) defined through the outer casing 18 for providing internal access to one or both of the compressors 22, 24 and/or for providing internal access to one or both of the turbines 28, 32. In several embodiments, the access ports 62 may be spaced apart axially along the core engine 14. For instance, the access ports 62 may be spaced apart axially along each compressor 22, 24 and/or each turbine 28, 32 such that at least one access port 62 is located at each compressor stage and/or each turbine stage for providing access to the internal components located at such stage(s). In addition, the access ports 62 may also be spaced apart circumferentially around the core engine 14. For instance, a plurality of access ports 62 may be spaced apart circumferentially around each compressor stage and/or turbine stage.

It should be appreciated that, although the access ports 62 are generally described herein with reference to providing internal access to one or both of the compressors 22, 24 and/or for providing internal access to one or both of the turbines 28, 32, the gas turbine engine 10 may include access ports 62 providing access to any suitable internal location of the engine 10, such as by including access ports 62 that provide access within the combustor 26 and/or any other suitable component of the engine 10.

Figure 2:
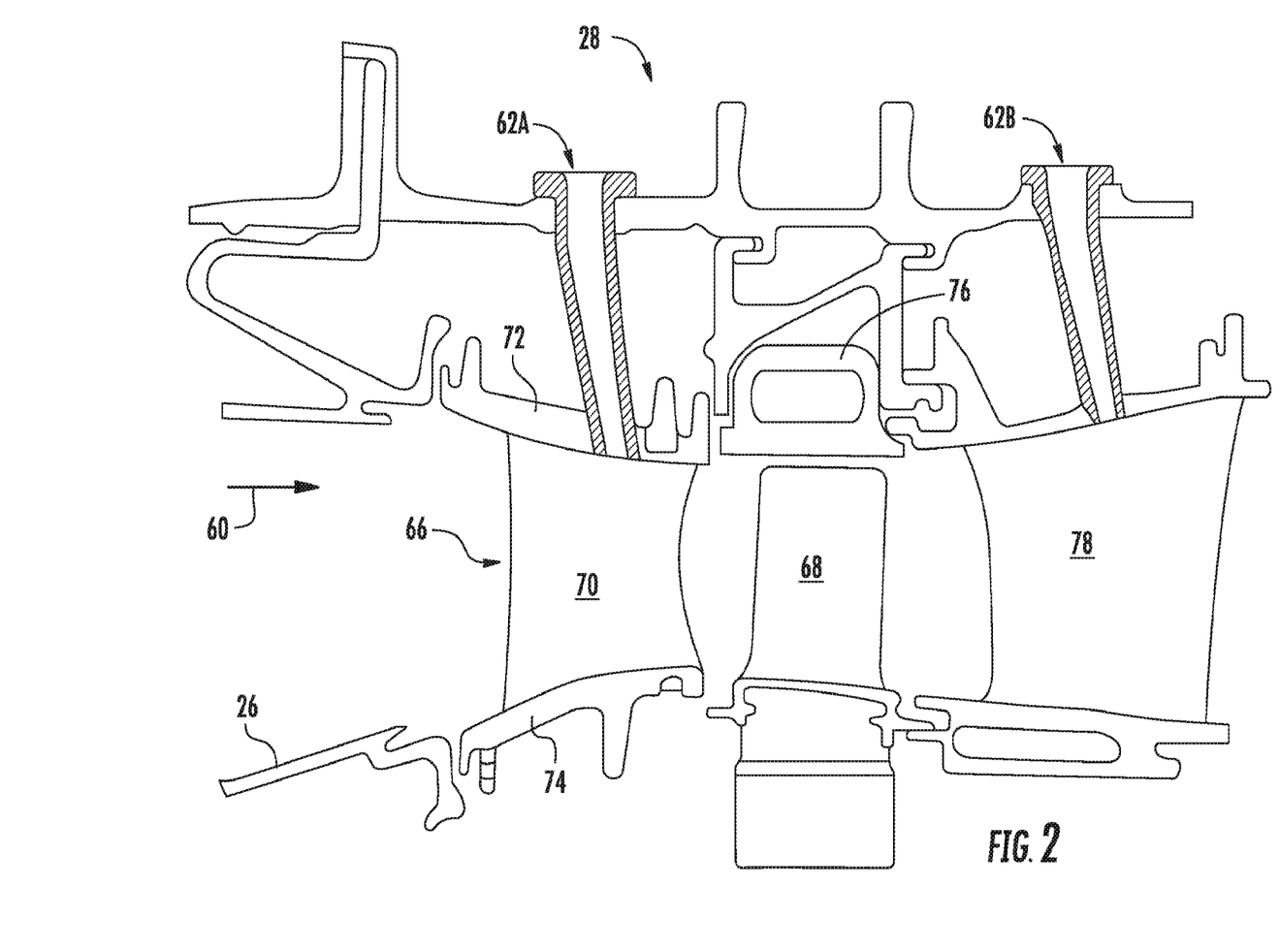
FIG. 2 illustrates a partial, cross-sectional view of one embodiment of a turbine suitable for use within the gas turbine engine shown in FIG. 1, particularly illustrating access ports defined in the engine for providing internal access to the turbine.

Referring now to FIG. 2, a partial, cross-sectional view of the first (or high pressure) turbine 28 described above with reference to FIG. 1 is illustrated in accordance with embodiments of the present subject matter. As shown, the first turbine 28 may include a first stage turbine nozzle 66 and an annular array of rotating turbine blades 68 (one of which is shown) located immediately downstream of the nozzle 66. The nozzle 66 may generally be defined by an annular flow channel that includes a plurality of radially-extending, circularly-spaced nozzle vanes 70 (one of which is shown). The vanes 70 may be supported between a number of arcuate outer bands 72 and arcuate inner bands 74. Additionally, the circumferentially spaced turbine blades 68 may generally be configured to extend radially outwardly from a rotor disk (not shown) that rotates about the centerline axis 12 (FIG. 1) of the engine 10. Moreover, a turbine shroud 76 may be positioned immediately adjacent to the radially outer tips of the turbine blades 68 so as to define the outer radial flowpath boundary for the combustion products 60 flowing through the turbine 28 along the hot gas path of the engine 10.

As indicated above, the turbine 28 may generally include any number of turbine stages, with each stage including an annular array of nozzle vanes and follow-up turbine blades 68. For example, as shown in FIG. 2, an annular array of nozzle vanes 78 of a second stage of the turbine 28 may be located immediately downstream of the turbine blades 68 of the first stage of the turbine 28.

Moreover, as shown in FIG. 2, a plurality of access ports 62 may be defined through the turbine casing and/or frame, with each access port 62 being configured to provide access to the interior of the turbine 28 at a different axial location. Specifically, as indicated above, the access ports 62 may, in several embodiments, be spaced apart axially such that each access port 62 is aligned with or otherwise provides interior access to a different stage of the turbine 28. For instance, as shown in FIG. 2, a first access port 62A may be defined through the turbine casing/frame to provide access to the first stage of the turbine 28 while a second access port 62B may be defined through the turbine casing/frame to provide access to the second stage of the turbine 28.

It should be appreciated that similar access ports 62 may also be provided for any other stages of the turbine 28 and/or for any turbine stages of the second (or low pressure) turbine 32. It should also be appreciated that, in addition to the axially spaced access ports 62 shown in FIG. 2, access ports 62 may be also provided at differing circumferentially spaced locations. For instance, in one embodiment, a plurality of circumferentially spaced access ports may be defined through the turbine casing/frame at each turbine stage to provide interior access to the turbine 28 at multiple circumferential locations around the turbine stage.

Figure 3:
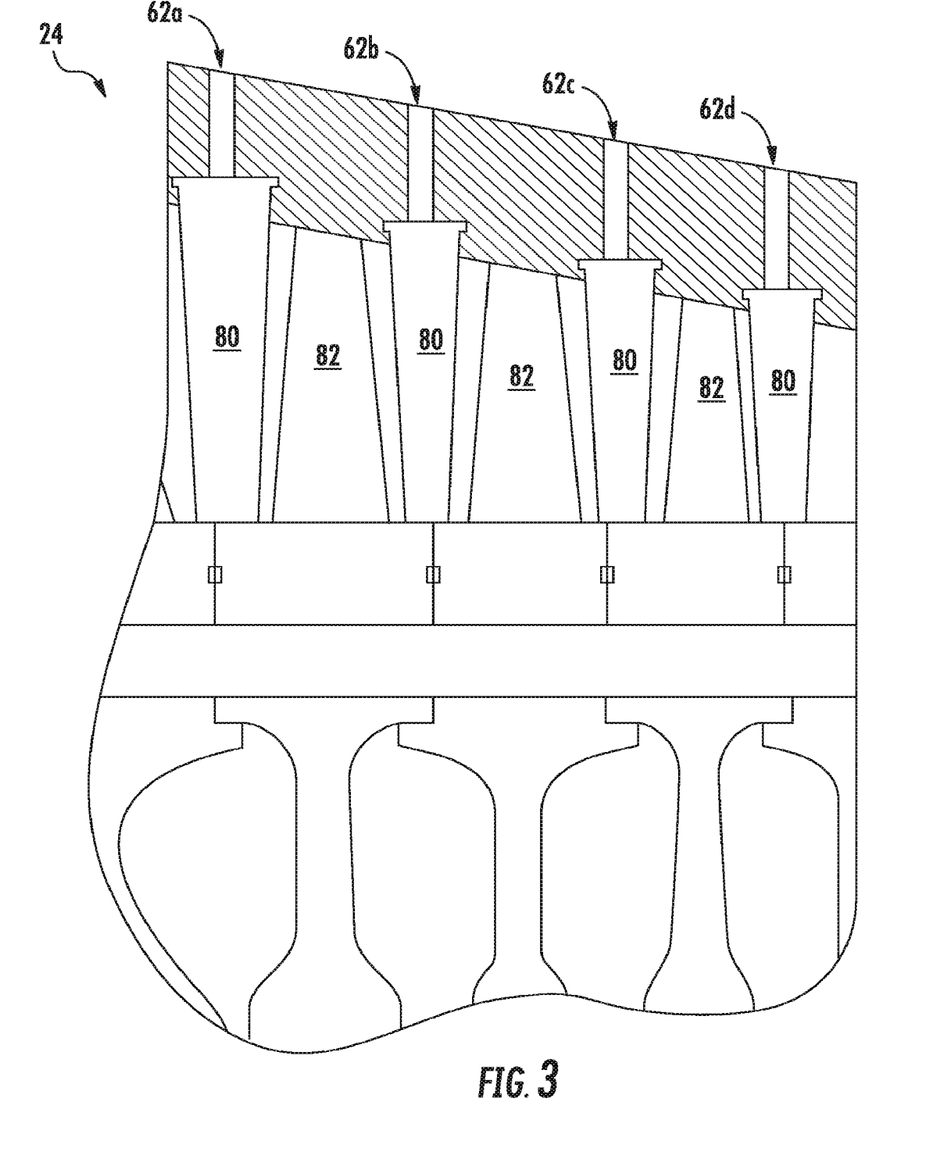
FIG. 3 illustrates a partial, cross-sectional view of one embodiment of a compressor suitable for use within the gas turbine engine shown in FIG. 1, particularly illustrating access ports defined in the engine for providing internal access to the compressor.

Referring now to FIG. 3, a partial, cross-sectional view of the high pressure compressor 24 described above with reference to FIG. 1 is illustrated in accordance with embodiments of the present subject matter. As shown, the compressor 24 may include a plurality of compressor stages, with each stage including both an annular array of fixed compressor vanes 80 (only one of which is shown for each stage) and an annular array of rotatable compressor blades 82 (only one of which is shown for each stage). Each row of compressor vanes 80 is generally configured to direct air flowing through the compressor 24 to the row of compressor blades 82 immediately downstream thereof.

Moreover, the compressor 24 may include a plurality of access ports 62 defined through the compressor casing/frame, with each access port 62 being configured to provide access to the interior of the compressor 24 at a different axial location. Specifically, in several embodiments, the access ports 62 may be spaced apart axially such that each access port 62 is aligned with or otherwise provides interior access to a different stage of the compressor 24. For instance, as shown in FIG. 3, first, second, third and fourth access ports 62a, 62b, 62c, 62d are illustrated that provide access to four successive stages, respectively, of the compressor 24.

It should be appreciated that similar access ports 62 may also be provided for any of the other stages of the compressor 24 and/or for any of the stages of the low pressure compressor 22. It should also be appreciated that, in addition to the axially spaced access ports 62 shown in FIG. 3, access ports 62 may also be provided at differing circumferentially spaced locations. For instance, in one embodiment, a plurality of circumferentially spaced access ports may be defined through the compressor casing/frame at each compressor stage to provide interior access to the compressor 24 at multiple circumferential locations around the compressor stage.

Figure 4:
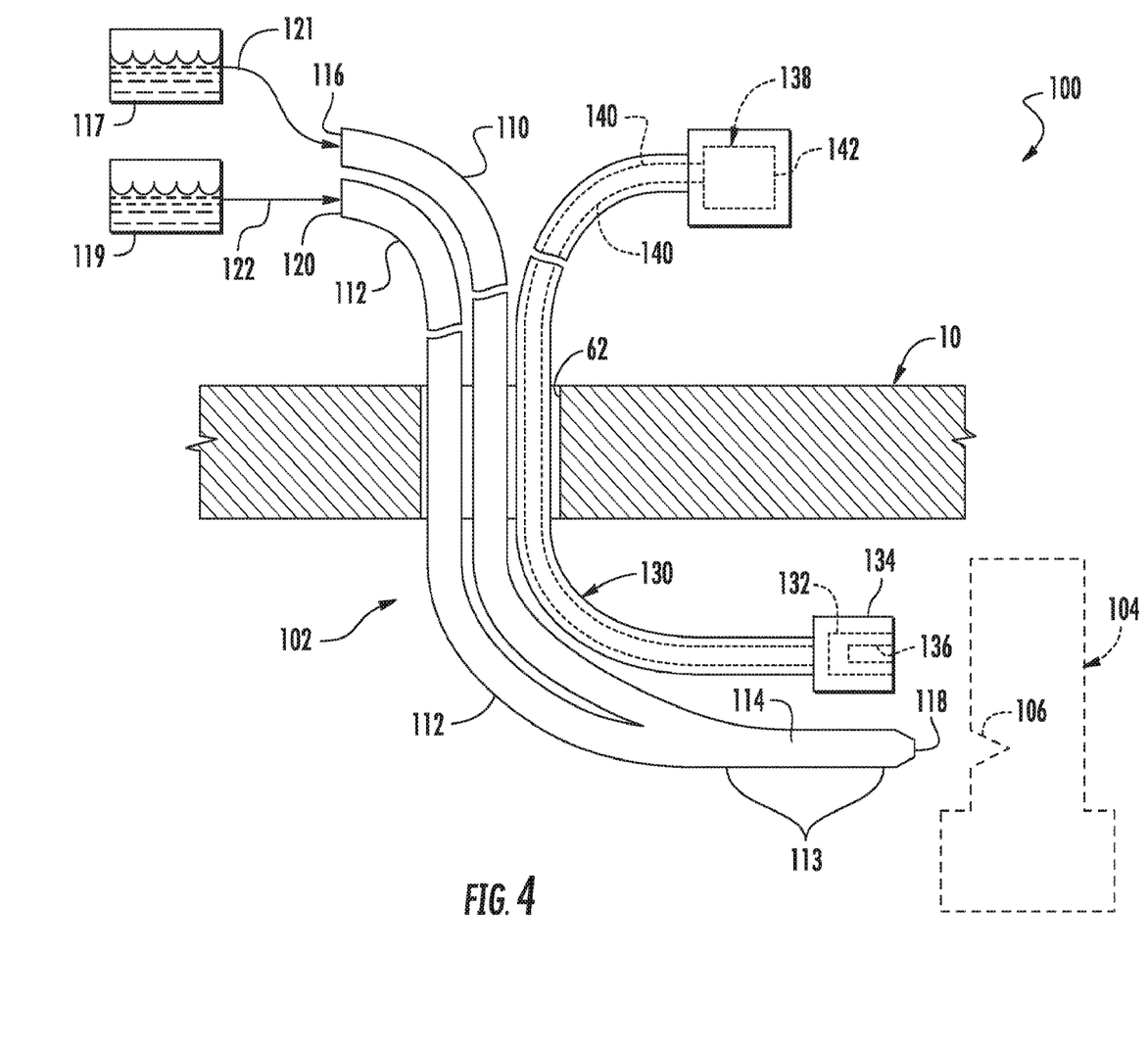
FIG. 4 illustrates a simplified view of one embodiment of a system for performing an in situ repair of an internal component of a gas turbine engine in accordance with aspects of the present subject matter, particularly illustrating one embodiment of a repair tool that may be inserted through an access port of the engine for supplying first and second constituent materials of a repair agent to a defect of the internal component.
Figure 5:
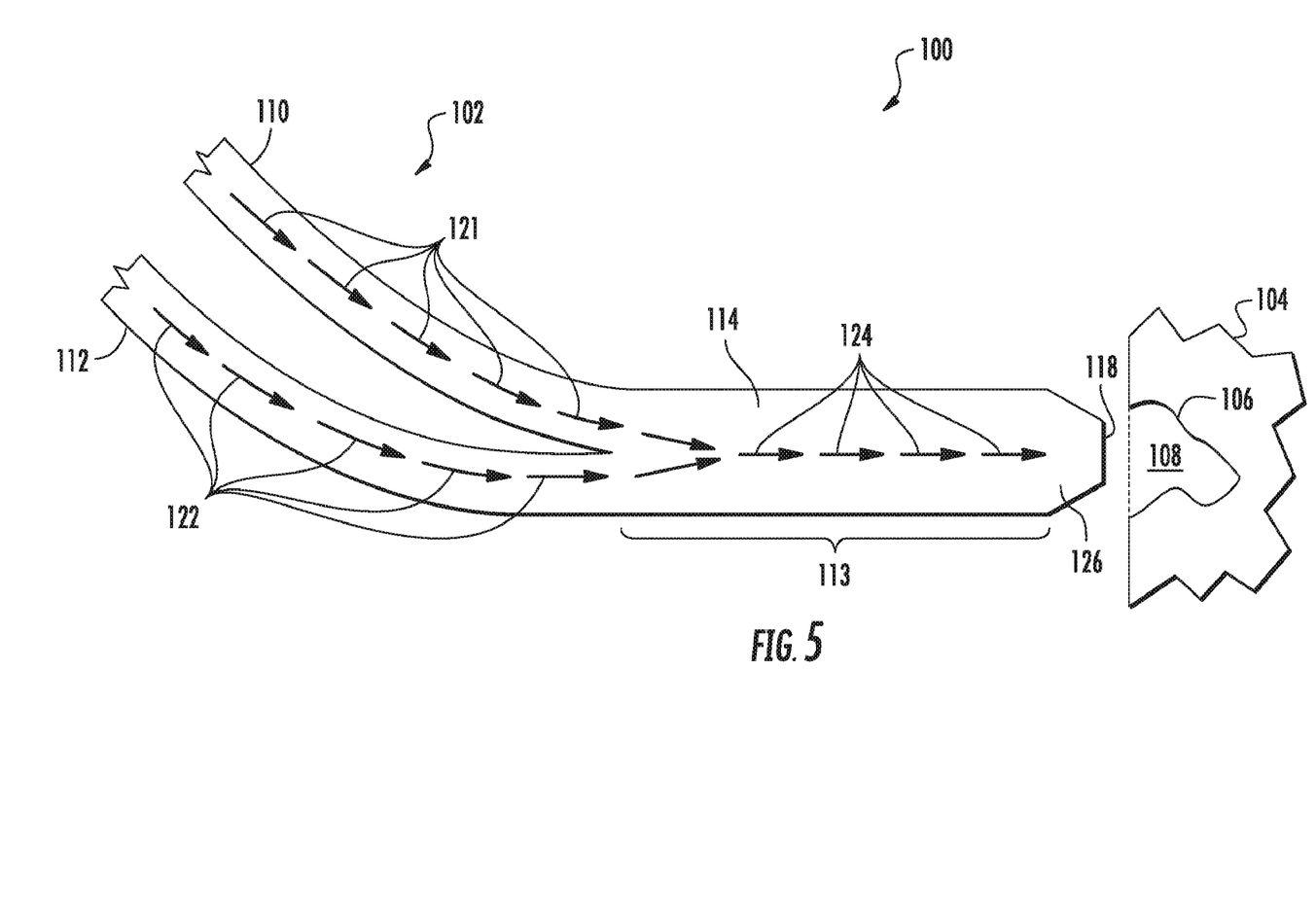
FIG. 5 illustrates a partial, cross-sectional view of the repair tool and the internal component shown in FIG. 4, particularly illustrating a mixing conduit of the repair tool that extends between first and second conduits of the repair tool and a tip end of the repair tool for receiving the first and second constituent materials.

Referring now to FIGS. 4 and 5, simplified views of one embodiment of a system 100 for performing an in situ repair of an internal component of a gas turbine engine 10 are illustrated in accordance with aspects of the present subject matter. The system 100 may include a repair tool 102 configured to be inserted within an interior of the gas turbine engine 10 to allow an in situ repair procedure to be performed on an internal component(s) (indicated by dashed lines 104 in FIG. 4) of the engine 10. More specifically, as shown in the embodiment depicted in FIG. 4, the repair tool 102 may be configured to be inserted through an access port 62 of the gas turbine 10, such as any of the access ports 62 described above with reference to FIGS. 1-3.

In general, the repair tool 102 may correspond to any suitable tool(s) and/or component(s) that may be inserted within the interior of the gas turbine engine 10 to allow a repair agent 124 (FIG. 5) to be supplied within the engine 10 for repairing an identified defect 106 of the internal engine component(s) 104 being repaired (e.g., a turbine blade(s)). For example, as particularly shown in FIG. 5, the defect 106 corresponds to a crack, void or other defective area formed along the exterior of the component 104 that defines an open or fillable volume 108. As such, by supplying the repair agent 124 to the location of the defect via the repair tool 102, the fillable volume 108 may be filled-in with the repair agent 124, thereby repairing the defect 106.

In several embodiments, when the repair tool 102 is inserted within the interior of the gas turbine engine 10, the repair tool may define a mixing location 113 along its length that is positioned within the interior of the gas turbine engine 10. In such embodiments, the repair tool 102 may be configured to supply separate constituent materials of the repair agent 124 to the mixing location 113 defined within the interior of the gas turbine engine 10. For example, a first constituent material 121 and a second constituent material 122 may be transported via the repair tool 102 from a location exterior to the gas turbine engine 10 to the mixing location 113 within the engine 10. At the mixing location 113, the first and second constituent materials 121, 122 may be intermixed to form the repair agent 124, which may then be injected or otherwise directed into the fillable volume 108 defined by the defect 106 to repair the internal component 104.

It should be appreciated that the first and second constituent materials 121, 122 of the repair agent 124 may generally correspond to any suitable material, such as any suitable filler material configured to "fill" the fillable volume 108 defined by the defect 106. For example, in one embodiment, the first constituent material 121 may correspond to a resin, and the second constituent material 122 may correspond to a hardener. In such an embodiment, the resin and hardener may intermix at the mixing location 113 to form the repair agent 124, such as by forming an epoxy at the mixing location 113.

As shown in FIG. 4, the repair tool 102 may generally extend lengthwise between first and second supply ends 116, 120 configured to be positioned outside the gas turbine engine 10 and a tip end 118 configured to be positioned within the gas turbine engine 10. In several embodiments, the repair tool 102 may include first and second conduits 110 and 112 for transporting the first and second constituent materials 121, 122 from outside the gas turbine engine 10 to a corresponding mixing conduit 114 of the repair tool 102 extending from the mixing location 113 within the gas turbine engine 10. For example, the first conduit 110 may be configured to extend from the first supply end 116 of the repair tool 102 through the access port 62 to the interior of the gas turbine engine 10 while the second conduit 112 may be configured to extend from the second supply end 120 of the repair tool 102 through the access port 62 to the interior of the gas turbine engine 10. Additionally, as shown in FIGS. 4 and 5, the first and second conduits 110, 112 may be configured to merge with one another within the gas turbine engine 10 at the mixing conduit 114 such that the mixing conduit 114 extends from the merged location of the first and second conduits 110, 112 to the tip end 118 of the repair tool 102.

As shown in FIGS. 4 and 5, the first conduit 110 may be configured to receive the first constituent material 121 at the first supply end 116 of the repair tool 102 (e.g., from a suitable material source 117) while the second conduit 112 may be configured to receive the second constituent material 122 at the second supply end 120 of the repair tool 102 (e.g., from a suitable material source 119). In such an embodiment, the first conduit 110 may deliver the first constituent material 121 from the first supply end 116 to the mixing location 113 defined within the mixing conduit 114, and the second conduit 112 may deliver the second constituent material 122 from the second supply end 120 to the mixing location 113. Within the mixing conduit 114, the first and second constituent materials 121 and 122 may be intermixed to form the repair agent 124.

It should be appreciated that the tip end 118 of the repair tool 102 may generally be configured to be positioned adjacent to the location of the defect 106 for directing the repair agent 124 into the fillable volume 108. In several embodiments, the repair tool 102 may also include a nozzle 126 positioned at or adjacent to the tip end 118 of the repair tool. In general, the nozzle 126 may be configured to provide enhanced control of the direction of the flow of the repair agent 124 expelled from the repair tool 102. It should be appreciated that, in one embodiment, the nozzle 126 may be formed integrally with the mixing conduit 114. Alternatively, the nozzle 126 may correspond to a separate component configured to be separately coupled to the mixing conduit 114.

Additionally, the system 100 may also include an optical probe 130 configured to be used in association with the repair tool 102. For instance, as shown in FIG. 4, the optical probe 130 corresponds to a separate component configured to be used in combination with the repair tool 102 for repairing the defect 106. However, in other embodiments, the optical probe 130 may be coupled to or integrated within the repair tool 102. Additionally, as shown in FIG. 4, the optical probe 130 may be inserted through the same access port 62 as the repair tool 102. However, in other embodiments, the optical probe 130 may be inserted into a different access port 62 than the repair tool 102, such as an access port 62 located adjacent to the access port within which the repair tool 102 has been inserted.

In general, the optical probe 130 may correspond to any suitable optical device that allows images of the interior of the engine 10 to be captured or otherwise obtained. For instance, in several embodiments, the optical probe 130 may correspond to a borescope, videoscope, fiberscope or any other similar optical device known in the art that allows for the interior of a gas turbine engine 10 to be viewed through an access port 62. In such embodiments, the optical probe 130 may include one or more optical elements (indicated schematically by dashed box 132), such as one or more optical lenses, optical fibers, image capture devices, cables, and/or the like, for obtaining views or images of the interior of the gas turbine engine 10 at a tip 134 of the probe 130 for transmitting or relaying such images from the probe tip 134 along the length of the probe 130 to the exterior of the gas turbine engine 10 for viewing by the personnel performing the repair procedure on the internal component(s) 104. In addition, the probe 130 may include a light source (indicated by dashed box 136) positioned at or adjacent to the probe tip 134 to provide lighting within the interior of the engine 10.

As shown in FIG. 4, the optical probe 130 may also include an articulation assembly 138 that allows the orientation of the probe tip 134 to be adjusted within the interior of the gas turbine engine 10. For example, the articulation assembly 138 may allow for the probe tip 134 to be rotated or pivoted about a single axis or multiple axes to adjust the orientation of the probe tip 134 relative to the remainder of the probe 130. It should be appreciated that the articulation assembly 138 may generally have any suitable configuration and/or may include any suitable components that allow for adjustment of the orientation of the probe tip 134 and one or more articulation motors 142. In such an embodiment, by adjusting the tension of cables 140 via motor(s) 142, the probe tip 134 may be reoriented within the gas turbine engine 10.

Figure 6:
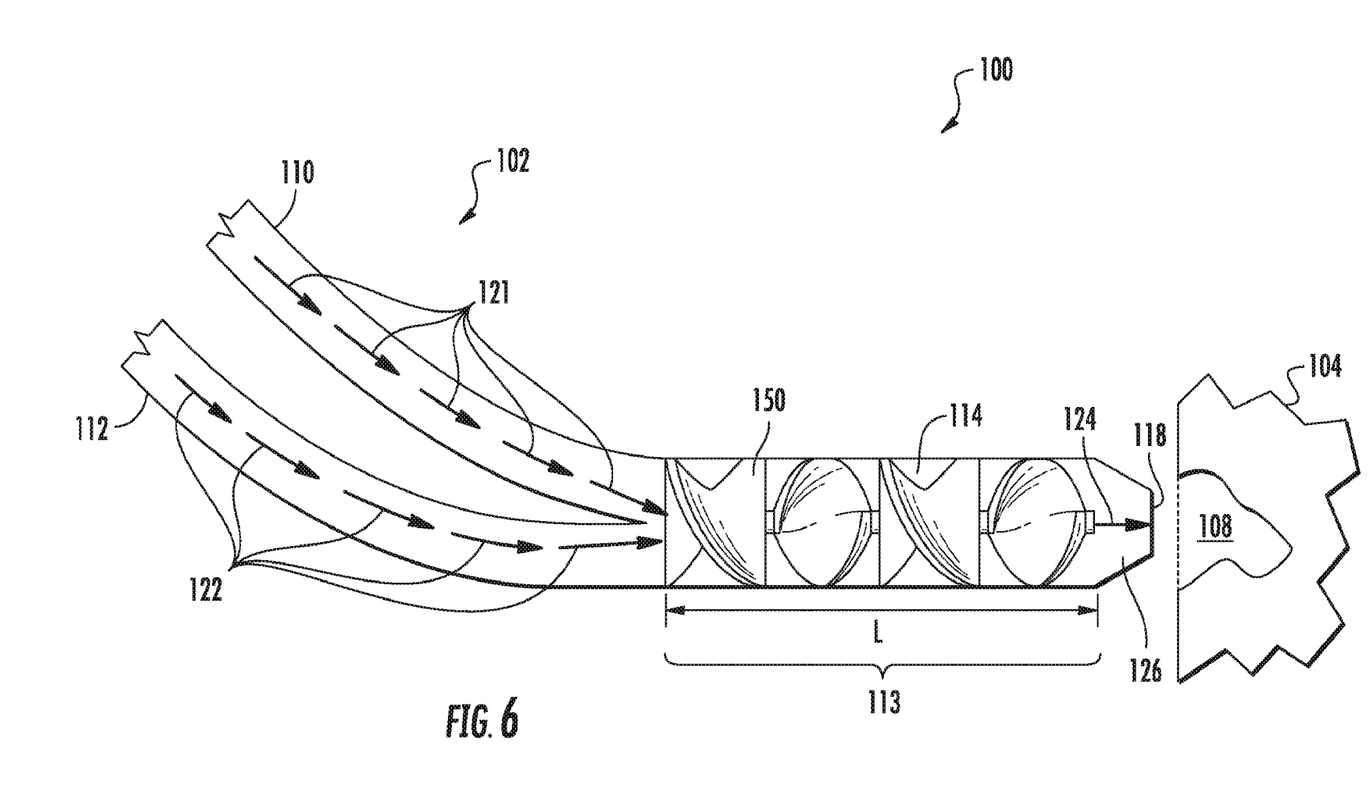
FIG. 6 illustrates another partial, cross-sectional view of the repair tool and internal component shown in FIG. 4, particularly illustrating another embodiment of the repair tool in which the mixing conduit includes a mixing element disposed therein to facilitate mixing of the first and second constituent materials within the mixing conduit.

Referring now to FIG. 6, a variation of the embodiment of the repair tool 102 shown in FIG. 5 is illustrated in accordance with aspects of the present subject matter. As shown, the repair tool 102 may, in some embodiments, include a mixing element 150 positioned within the mixing conduit 114. The mixing element 150 may be configured to urge the first and second constituent materials 121, 122 to intermix with one another at the mixing location 113 to form the repair agent 124. As shown, the mixing element 150 may define a helical shape and extend along a length L of the mixing conduit 114 to promote intermixing of the first and second constituent materials 121, 122 throughout the mixing conduit 114. For example, the mixing element 150 may force the first and second constituent materials 121, 122 along a helically-shaped travel path along the length L of the mixing conduit 114, thereby facilitating intermixing of the first and second constituent materials 121, 122 within the mixing conduit 114 as such constituent materials 121, 122 are supplied from the first and second conduits 110, 112 to the tip end 118 of the repair tool 102. Further, in one embodiment, the outer dimensions of the mixing element 150 may be adapted to the inner dimensions of the mixing conduit 114 to ensure that the first and second constituent materials 121, 122 cannot bypass the mixing element 150. For instance, the outer diameter of the mixing element 150 may be substantially equal to the inner diameter of the mixing conduit 114.

Figure 7:
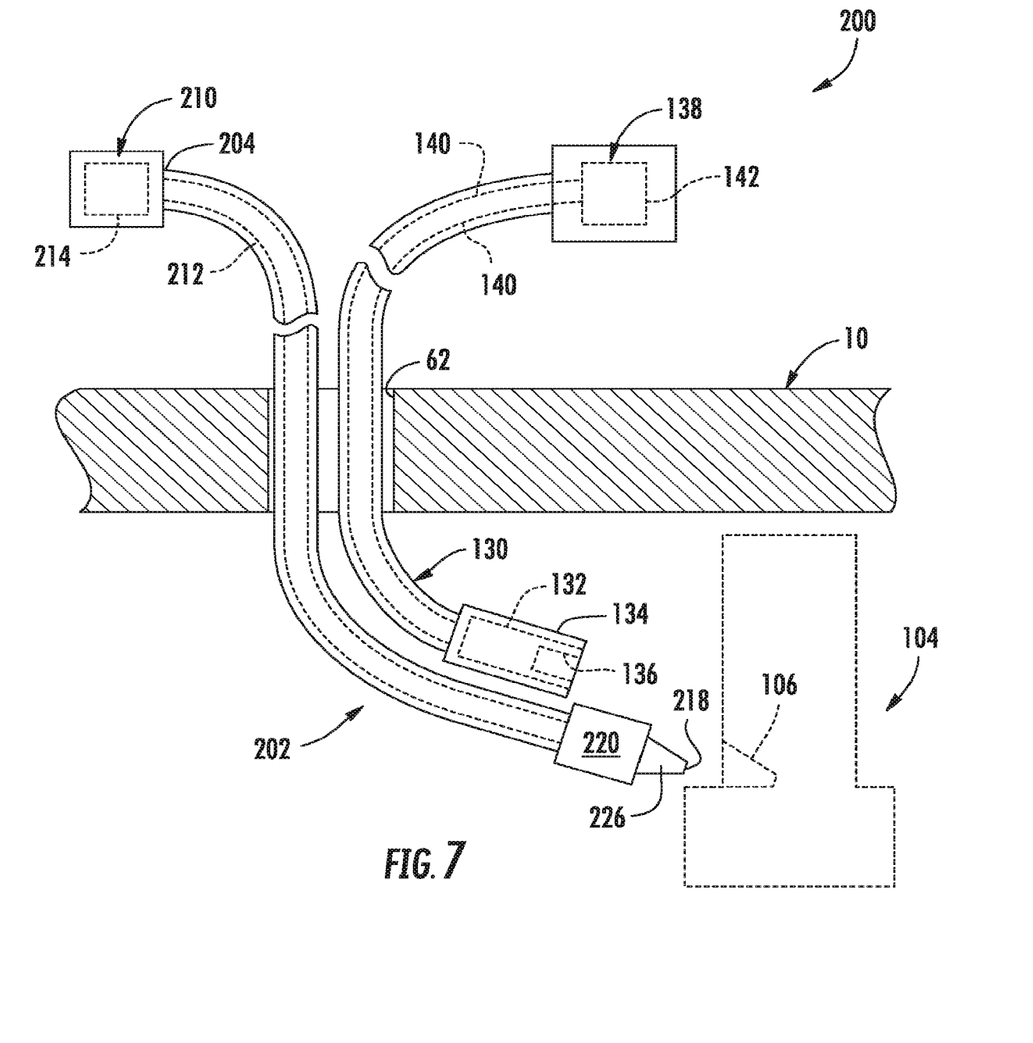
FIG. 7 illustrates a simplified view of another embodiment of a system for performing an in situ repair of an internal component of a gas turbine engine in accordance with aspects of the present subject matter, particularly illustrating another embodiment of a repair tool that may be inserted through an access port of the engine to supply a repair agent to a defect of the internal component.
Figure 8:
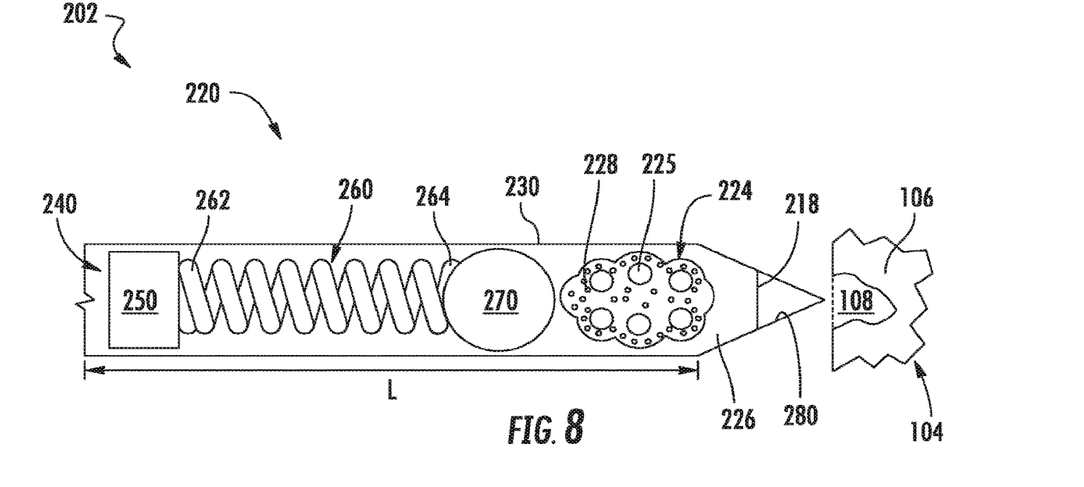
FIG. 8 illustrates a partial, cross-sectional view of the repair tool and the internal component shown in FIG. 7, particularly illustrating an agitator positioned within the repair tool at a mixing location defined immediately upstream from the tip end of the repair tool that is configured to agitate two or more constituents of the repair agent within the gas turbine engine prior to the repair agent being expelled from the repair tool.
Figure 9:
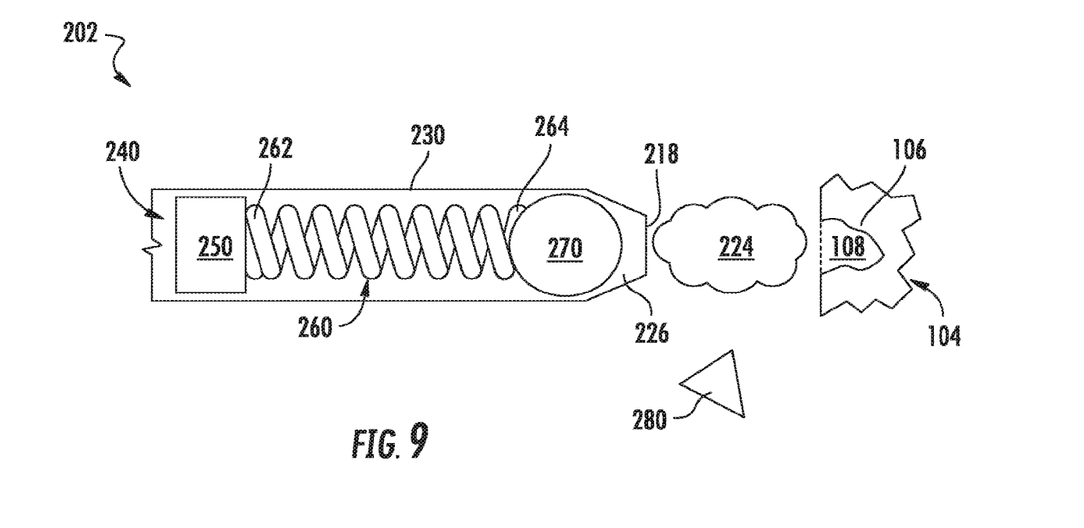
FIG. 9 illustrates another partial, cross-sectional view of the repair tool and the internal component shown in FIG. 8, particularly illustrating the repair agent being expelled from the tip end of the repair tool in a direction of the internal component.

Referring now to FIGS. 7-9, simplified views of another embodiment of a system 200 for performing an in situ repair of an internal component of a gas turbine engine 10 is illustrated in accordance with aspects of the present subject matter. The system 200 may include a repair tool 202 configured to be inserted within an interior of the gas turbine engine to allow an in situ repair procedure to be performed on an internal component(s) (indicated by dashed lines 104 in FIG. 7) of the gas turbine engine 10. More specifically, as shown in the embodiment depicted in FIG. 7, the repair tool 202 may be configured to be inserted through an access port 62 of the gas turbine 10, such as any of the access ports 62 described above with reference to FIGS. 1-3.

Similar to the repair tool 102 described above, the repair tool 202 may be configured to be inserted through an access port 62 of the gas turbine engine 10 to allow a repair agent 224 (FIGS. 8 and 9) to be supplied within the gas turbine engine 10 for filling-in a fillable volume 108 defined by an identified defect 106 formed in the internal component(s) 104 to be repaired (e.g., turbine blade(s)). However, unlike the embodiment described above, the repair tool 202 is not configured to supply first and second constituent materials of the repair agent 224 into the interior of the gas turbine engine 10 via separate conduits of the repair tool 202. Instead, the repair agent 224 may be pre-loaded into a mixing chamber 230 of the repair tool 202, wherein the mixing chamber 230 may define a mixing location 220 within the gas turbine 10. More specifically, the mixing location 220 of the repair tool 202 may, as shown in FIGS. 7-9, be defined immediately upstream of its tip end 218. In such an embodiment, first and second constituents 225, 228 of the repair agent 224 may be continuously or periodically intermixed with one another within the mixing chamber 230 as the tip end 218 of the repair tool 202 is being positioned adjacent to the defect 106 of the internal engine component(s) 104.

As shown in FIGS. 8 and 9, the mixing chamber 230 of the repair tool 202 may, in some embodiments, include an agitator 240 disposed therein. In one embodiment, the agitator 240 may include an actuator 250 operatively coupled to a spring 260 extending lengthwise between a first end 262 and a second end 264. In addition, the agitator 240 may include a plunger 270 attached to the second end 264 of the spring 260. In the embodiment shown, the plunger 270 is sized such that the plunger 270 may translate along a length L of the chamber 230.

In operation, the agitator 240 may be configured to intermix two or more constituent materials of the repair agent 224, such as the first and second constituents 225, 228, by operating the actuator 250 at a first vibratory or oscillatory rate in order to agitate the constituent materials. For example, in some embodiments, the actuator 250 may be an ultrasonic or pneumatic mixing driver configured to oscillate the plunger 270 (e.g., via the spring 260) at a mixing rate ranging from about 2 pounds per square inch (psi) to about 10 psi, such as from about 2 psi to about 8 psi, or from about 2 psi to about 5 psi or from about 2 psi to about 4 psi and/or any other subranges therebetween. By oscillating the plunger 270 at the mixing rate, the various constituents 225, 228 of the repair agent 224 may be agitated in a manner that results in the constituents 225, 228 being intermixed with one another within the mixing chamber 250.

It should be appreciated that, in several embodiments, the actuator 250 may be configured to receive electrical power from any suitable source. For instance, in one embodiment, the actuator 250 may receive electrical power from an articulation assembly (described below) of the repair tool 202. Alternatively, the actuator 250 may be configured to receive electrical power from an external source (not shown) via an electrical conduit extending between the external source and the actuator 250.

It should also be appreciated that, in several embodiments, the two or more of the constituents 225, 228 of the repair agent 224 may correspond to differently sized aggregates. For instance, in one embodiment, a cross-sectional area of the first constituent 225 may be greater than a cross-sectional area of the second constituent 228. In another embodiment, the cross-sectional area of the first constituent 225 may be less than the cross-sectional area of the second constituent 228.

Further, in several embodiments, the actuator 250 may be configured to oscillate the plunger 270 (e.g., via the spring 260) at a second vibratory or oscillatory rate that is higher than the first mixing rate such that the spring 260 forces the plunger 270 outwardly away from the actuator 250 along the length L of the chamber 230 towards the tip end 218 of the repair tool 202 to allow the repair agent 224 to be expelled from the repair tool 202. Additionally, the repair tool 202 may, optionally, include a cover 280 that is removably coupled to the tip end 218 of the repair tool 202. In such an embodiment, when the actuator 250 is operated so as to oscillate the plunger 270 at the second higher rate, a force may be generated through the repair agent 224 that is sufficient to push the cover 280 off of the tip end 218 of the repair tool 202, thereby allowing the repair agent 224 to be expelled from the tip end 218.

As shown in FIG. 7, the repair tool 202 may also include an articulation assembly 210 positioned at an exterior end 204 of the repair tool 202. In operation, the articulation assembly 210 allows the orientation of the repair tool 202 to be adjusted within the interior of the gas turbine engine 10. For example, the articulation assembly 210 may allow for the tip end 218 to be rotated or pivoted about a single axis or multiple axes to adjust the orientation of the tip end 218. It should be appreciated that the articulation assembly 210 may generally have any suitable configuration and/or may include any suitable components that allow for adjustment of the orientation of the tip end 218. For example, in one embodiment, a plurality of articulation cables 212 may be coupled between the tip 218 and one or more articulation motors 214. In such an embodiment, by adjusting the tension of the cables 212 via the motor(s) 214, the tip end 218 may be reoriented within the gas turbine engine 10.

Additionally, the system 200 may also include an optical probe 130 configured in substantially the same manner as the optical probe 130 depicted in FIG. 4, and accordingly, the same or similar numbers may refer to the same or similar parts. For example, the optical probe 130 may include one or more optical elements 132, a probe tip 134, an articulation assembly 138, articulation cables 140, and articulation motor(s) 142. Accordingly, the optical probe 130 of FIG. 7 may operate in substantially the same manner as described above for the optical probe 130 of FIG. 4.

Figure 10:
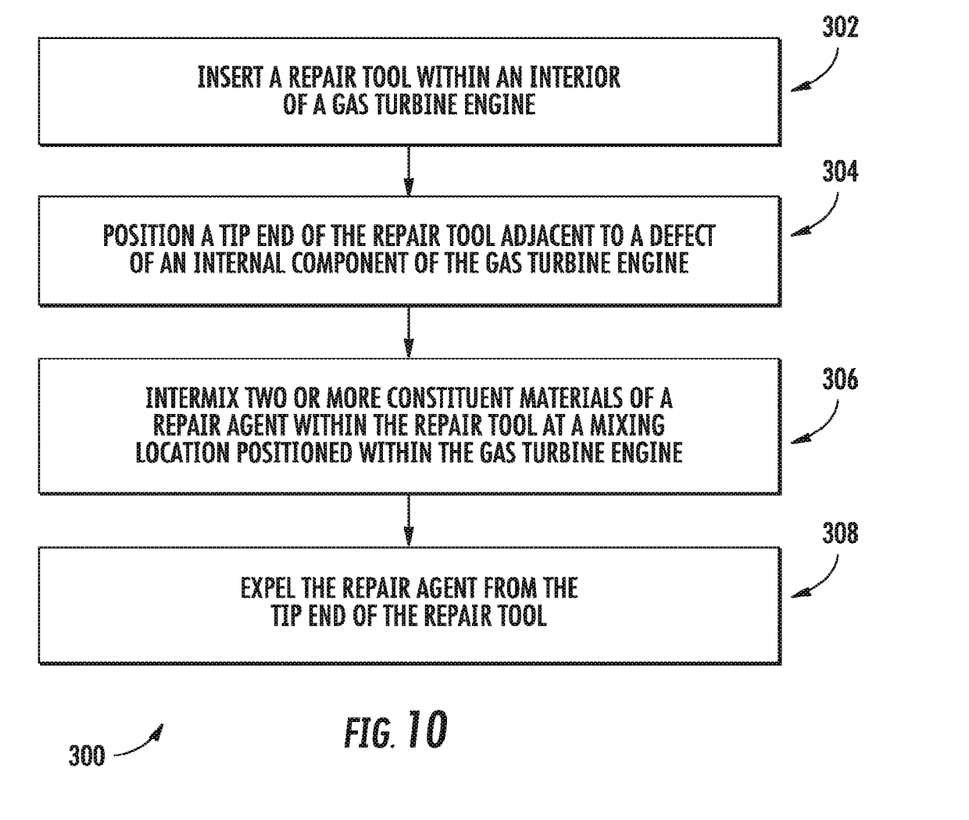
FIG. 10 illustrates a flow diagram of one embodiment of a method for performing an in situ repair of an internal component of a gas turbine engine in accordance with aspects of the present subject matter.

Referring now to FIG. 10, a flow diagram of one embodiment of a method 300 for performing an in situ repair of an internal component of a gas turbine engine is illustrated in accordance with aspects of the present subject matter. In general, the method 300 will be discussed herein with reference to the gas turbine engine 10 and the systems 100, 200 described above with reference to FIGS. 1-9. However, it should be appreciated by those of ordinary skill in the art that the disclosed method 300 may generally be implemented with gas turbine engines having any other suitable engine configuration and/or with systems having any other suitable system configuration. In addition, although FIG. 10 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 10, at (302), the method 300 may include inserting a repair tool within an interior of the gas turbine engine. Specifically, in one embodiment, the repair tool may be inserted through an access port of the gas turbine engine such that a tip end of the repair tool is positioned within the interior of the gas turbine engine, and at least one exterior end of the repair tool is positioned outside the gas turbine engine. Additionally, at (304), the method 300 may include positioning the tip end of the repair tool adjacent to a defect of an internal component of the gas turbine engine. As indicated above, the defect may define a fillable volume along a portion of the internal component.

Moreover, at (306), the method 300 may include intermixing two or more constituents of a repair agent within the repair tool at a mixing location within the gas turbine engine. For example, as indicated above, the repair tool may, in one embodiment, include first and second conduits that extend into the gas turbine engine separately and merge within the gas turbine at the mixing location such that a first constituent material flowing through the first conduit and a second constituent material flowing through the second conduit merge at the mixing location to allow the first and second constituent materials to be intermixed to form the repair agent. As another example, the repair agent may be pre-loaded into a mixing chamber positioned at the mixing location. In such an embodiment, an agitator disposed within the mixing chamber may be configured to periodically or continuously intermix two or more constituents of the repair agent within the gas turbine engine.

Further, at (308), the method 300 may include expelling the repair agent from the tip end of the repair tool. In particular, the repair agent may be expelled in a direction of the defect of the internal component to at least partially fill the fillable volume with the repair agent, thereby allowing the defect to be repaired This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for performing in situ repairs of internal components of a gas turbine engine, the method comprising:
inserting a repair tool having an agitator within an interior of a gas turbine engine, the repair tool including a tip end positioned within the interior of the gas turbine engine and at least one exterior end positioned outside the gas turbine engine, the agitator including an actuator operatively coupled to a spring extending between a first end and a second end, the agitator further including a plunger attached to the second end of the spring, and the actuator is operatively coupled to the first end of the spring;
positioning the tip end of the repair tool adjacent to a defect of an internal component of the gas turbine engine, the defect defining a fillable volume along a portion of the internal component;
intermixing two or more constituents of a repair agent including a resin and a hardener within the repair tool at a mixing location positioned within the interior of the gas turbine engine; and
expelling the repair agent from the tip end of the repair tool such that the fillable volume is at least partially filled with the repair agent;
wherein the two or more constituents include a first constituent material flowing through a first conduit of the repair tool and a second constituent material flowing through a second conduit of the repair tool; and
wherein the first conduit and second conduit merge at or adjacent to the mixing location of the repair tool.

2. The method of claim 1, wherein intermixing the two or more constituent materials of the repair agent comprises supplying the first constituent material and the second constituent material through the first conduit and the second conduit to the mixing location such that the first constituent material and the second constituent material are intermixed.

3. A system for performing in situ repairs of internal components of a gas turbine engine, the system comprising:
an internal component installed within a gas turbine engine, the internal component including a defect defining a fillable volume;
a repair tool extending lengthwise between a tip end configured to be positioned within the gas turbine engine adjacent to the defect of the internal component and an exterior end positioned outside the gas turbine engine, the repair tool including a mixing chamber that defines a mixing location within the gas turbine engine, the mixing chamber including two or more constituents of a repair agent contained therein, the repair tool further including an agitator positioned within the mixing chamber that is configured to intermix the two or more constituents of the repair agent including a resin and a hardener within the mixing chamber, the agitator including an actuator operatively coupled to a spring extending between a first end and a second end, the agitator further including a plunger attached to the second end of the spring, and the actuator is operatively coupled to the first end of the spring,
wherein the repair tool is configured to expel the repair agent from the tip end of the repair tool such that the fillable volume is at least partially filled with the repair agent.

4. The system of claim 3, wherein the actuator is configured to oscillate the plunger at one or more rates within the mixing chamber.

5. The system of claim 4, wherein the actuator is configured to oscillate the plunger at a first mixing rate to agitate the two or more constituents of the repair agent within the mixing chamber such that the two or more constituents are intermixed with one another.

6. The system of claim 4, wherein the actuator is configured to oscillate the plunger at a second rate to allow the repair agent to be expelled from the tip end of the repair tool, the second rate being higher than a first mixing rate.

7. The system of claim 6, wherein the repair tool includes a cover removably coupled to the tip end, and wherein the cover is configured to be pushed off of the tip end when the plunger is oscillated at the second rate to allow the repair agent to be expelled from the tip end of the repair tool.

8. The system of claim 3, wherein the two or more constituents include a first constituent and a second constituent, and wherein a cross-sectional area of the first constituent is larger than a cross-sectional area of the second constituent.

9. A system for performing in situ repairs of internal components of gas turbine engine, the system comprising:
an internal component installed within a gas turbine engine, the internal component including a defect defining a fillable volume;
a repair tool configured to receive a first constituent material and a second constituent material, the repair tool extending between a tip end configured to be positioned within the gas turbine engine adjacent to the defect of the internal component and a first supply end and a second supply end configured to be positioned outside of the gas turbine engine, the repair tool including a first conduit extending between the first supply end and the tip end that receives the first constituent material and a second conduit extending between the second supply end and the tip end that receives the second constituent material, the first conduit and the second conduit merging at or adjacent to a mixing location of the repair tool positioned within the gas turbine engine such that the first constituent material and the second constituent material are intermixed at the mixing location to form a repair agent including a resin and a hardener, the repair tool further including an agitator positioned at the mixing location that is configured to intermix the first constituent material and the second constituent material, the agitator including an actuator operatively coupled to a spring extending between a first end and a second end, the agitator further including a plunger attached to the second end of the spring, and the actuator is operatively coupled to the first end of the spring;
wherein the repair tool is configured to expel the repair agent from the tip end of the repair tool such that the fillable volume is at least partially filled with the repair agent.

10. The system of claim 9, wherein the first constituent material is the resin and the second constituent material is the hardener, and wherein the repair agent is an epoxy.

11. The system of claim 9, wherein the mixing location is defined within a mixing conduit of the repair tool, the mixing conduit extending between a location at which the first conduit and the second conduit merge and the tip end of the repair tool such that the first constituent material and the second constituent material are supplied from the first conduit and the second conduit to the tip end through the mixing conduit.

12. The system of claim 11, wherein a mixing element defines a helical shape having an outer dimension adapted to an inner dimension of the mixing conduit.

13. The system of claim 9, further comprising an optical probe configured to be inserted through an access port of the gas turbine engine, the optical probe being configured to provide a view of the defect within the gas turbine engine.

* * * * *